US 9,610,537 B2

(12) United States Patent
Chen et al.

(10) Patent No.: US 9,610,537 B2
(45) Date of Patent: Apr. 4, 2017

(54) LOOP TOWER $CO_2$ CAPTURE SYSTEM, CARBONATOR, CALCINER AND OPERATING METHOD THEREOF

(71) Applicants: INDUSTRIAL TECHNOLOGY RESEARCH INSTITUTE, Hsinchu (TW); TAIWAN CEMENT CORPORATION, Taipei (TW)

(72) Inventors: Wei-Cheng Chen, New Taipei (TW); Shoung Ouyang, Taipei (TW); Chin-Ming Huang, New Taipei (TW); Cheng-Hsien Shen, Tainan (TW); Heng-Wen Hsu, Hsinchu County (TW)

(73) Assignees: Industrial Technology Research Institute, Hsinchu (TW); Taiwan Cement Corporation, Taipei (TW)

( * ) Notice: Subject to any disclaimer, the term of this patent is extended or adjusted under 35 U.S.C. 154(b) by 161 days.

(21) Appl. No.: 14/275,223

(22) Filed: May 12, 2014

(65) Prior Publication Data

US 2015/0157978 A1 Jun. 11, 2015

(30) Foreign Application Priority Data

Dec. 11, 2013 (TW) .............................. 102145724 A

(51) Int. Cl.
*B01J 8/14* (2006.01)
*B01J 8/38* (2006.01)
(Continued)

(52) U.S. Cl.
CPC ............ *B01D 53/62* (2013.01); *B01D 53/83* (2013.01); *B01J 6/004* (2013.01); *B01J 8/14* (2013.01);
(Continued)

(58) Field of Classification Search
None
See application file for complete search history.

(56) References Cited

U.S. PATENT DOCUMENTS 3,891,382 A 6/1975 Lawall et al.
3,982,886 A 9/1976 Christiansen
(Continued)

FOREIGN PATENT DOCUMENTS

CN 1618761 A 5/2005
CN 1799725 A 7/2006
(Continued)

OTHER PUBLICATIONS

Machine translation for EP 0008770 A1 (Mar. 1980).*
(Continued)

*Primary Examiner* — Jennifer A Leung
(74) *Attorney, Agent, or Firm* — Muncy, Geissler, Olds & Lowe, P.C.

(57) ABSTRACT

A loop tower CO2 capture system includes a feeding unit, a carbonator, an accumulator, a calciner, a combustion chamber and a gas blower. The feeding unit has a first gas pipe. The carbonator includes multiple first cyclone dust collecting units. The first gas pipe has one end connected to the uppermost first cyclone dust collecting unit. The accumulator is connected to the lowermost first cyclone dust collecting unit, and is located between the carbonator and the calciner. The calciner includes multiple second cyclone dust collecting units. The accumulator is connected to the uppermost second cyclone dust collecting unit. The first gas pipe has the other end connected to the lowermost second cyclone dust collecting unit. The combustion chamber is connected to the lowermost second cyclone dust collecting unit. The gas blower is connected to the first gas pipe of the feeding unit.

17 Claims, 2 Drawing Sheets

(51) Int. Cl.
  *B01J 6/00*   (2006.01)
  *C01B 13/14*  (2006.01)
  *C01B 31/24*  (2006.01)
  *B01D 53/62*  (2006.01)
  *B01D 53/83*  (2006.01)
  *B01D 45/16*  (2006.01)

(52) U.S. Cl.
  CPC .............. *B01J 8/384* (2013.01); *C01B 13/14* (2013.01); *C01B 31/24* (2013.01); *B01D 45/16* (2013.01); *B01D 2251/404* (2013.01); *B01D 2251/602* (2013.01); *B01D 2257/504* (2013.01); *B01D 2258/0283* (2013.01); *Y02C 10/04* (2013.01); *Y02C 10/08* (2013.01)

(56) References Cited

U.S. PATENT DOCUMENTS

| | | | |
|---|---|---|---|
| 4,169,701 A | 10/1979 | Katayama et al. | |
| 4,707,350 A * | 11/1987 | Baudequin | C04B 2/10 165/104.16 |
| 5,665,319 A * | 9/1997 | Hirama | B01D 53/12 110/203 |
| 7,549,859 B2 | 6/2009 | Dupuis | |
| 7,976,628 B2 | 7/2011 | Blount et al. | |
| 8,607,469 B2 | 12/2013 | Ueno et al. | |
| 2001/0022952 A1 | 9/2001 | Rau et al. | |
| 2001/0038989 A1 | 11/2001 | Ramesohl et al. | |
| 2003/0143508 A1 | 7/2003 | Ramesohl et al. | |
| 2004/0173096 A1 | 9/2004 | Terasaki et al. | |
| 2005/0060985 A1 * | 3/2005 | Abanades Garcia | B01D 53/343 60/274 |
| 2005/0181322 A1 | 8/2005 | Jensen | |
| 2007/0122762 A1 | 5/2007 | Hoffis et al. | |
| 2007/0178418 A1 | 8/2007 | Meyer et al. | |
| 2009/0255444 A1 | 10/2009 | Martinez Vera | |
| 2010/0329963 A1 * | 12/2010 | Sceats | B01D 53/62 423/437.1 |
| 2011/0070137 A1 | 3/2011 | Brock et al. | |
| 2011/0113957 A1 * | 5/2011 | Sceats | B01D 53/346 95/15 |
| 2013/0074695 A1 | 3/2013 | Handagama et al. | |
| 2014/0161696 A1 * | 6/2014 | Stallmann | B01D 53/1475 423/220 |
| 2014/0186247 A1 * | 7/2014 | Abanades Garcia | B01D 53/62 423/230 |
| 2014/0352581 A1 * | 12/2014 | Abanades Garcia | F23J 15/02 110/203 |

FOREIGN PATENT DOCUMENTS

| | | | | |
|---|---|---|---|---|
| CN | 101039735 A | 9/2007 | | |
| CN | 101065337 A | 10/2007 | | |
| CN | 200958081 Y | 10/2007 | | |
| CN | 101426747 A | 5/2009 | | |
| CN | 101434461 A | 5/2009 | | |
| CN | 101475324 A | 7/2009 | | |
| CN | 101608866 A | 12/2009 | | |
| CN | 101792276 A | 8/2010 | | |
| CN | 101972599 A | 2/2011 | | |
| CN | 202081023 U | 12/2011 | | |
| CN | 102309917 A | 1/2012 | | |
| CN | 102372450 A | 3/2012 | | |
| CN | 102452803 A | 5/2012 | | |
| CN | 102597677 A | 7/2012 | | |
| CN | 102649626 A | 8/2012 | | |
| CN | 102718373 A | 10/2012 | | |
| CN | 103175407 A | 6/2013 | | |
| DE | EP 0008770 A1 * | 3/1980 | ............ | B01D 53/34 |
| EP | 2 668 993 A1 | 12/2013 | | |
| FR | 2584308 A1 * | 1/1987 | ............ | C01B 31/20 |
| JP | H09-227184 A | 9/1997 | | |
| JP | 2008-239359 A | 10/2008 | | |
| TW | 200812935 A | 3/2008 | | |
| TW | 201326688 A | 7/2013 | | |
| TW | 201341731 A | 10/2013 | | |
| TW | 201413178 A | 4/2014 | | |

OTHER PUBLICATIONS

Romeo, Luis M. et al. Reduction of greenhouse gas emissions by integration of cement plants, power plants, and CO2 capture systems, *Greenhouse Gas Sci Technol.* 1:72-52 (2011).

Blamey, J. et al.The calcium looping Cycle for large-scale CO2 capture, *Progress in Energy and Combustion Science* 36 (2010) 260-279.

Yang Y, et al. Integration and evaluation of a power plant with a CaO-based CO2 capture system, *Int. J. Greenhouse Gas Control* (2010), doi:10.1016/j.ijggc.2010.01.004.

Romeo, Luis M. et al. Oxyfuel carbonation/calcination cycle for low cost CO2 capture in existing power plants, *Energy Conversion and Management* 49 (2008) 2809-2814.

Martinez, Ana et al, Operation of a Cyclonic Preheater in the Ca-Looping for CO2 Capture, *Environ. Sci. Technol.* 2013, 47, 11335-11341, dx.doi.org/10.1021/es401601k.

* cited by examiner

LOOP TOWER $CO_2$ CAPTURE SYSTEM, CARBONATOR, CALCINER AND OPERATING METHOD THEREOF

This application claims the benefit of Taiwan application Serial No. 102145724 filed Dec. 11, 2013, the disclosure of which is incorporated by reference herein in its entirety.

TECHNICAL FIELD

The disclosure relates in general to a $CO_2$ capture system, and more particularly to a loop tower $CO_2$ capture system, a carbonator, a calciner and an operating method thereof.

BACKGROUND

Capturing $CO_2$ from a flue gas through calcium cycling is one of the most recognized and promising carbon reduction technologies. In calcium cycling capture technology, a CaO absorbent reacts with $CO_2$ in the flue gas to produce $CaCO_3$ to thereby reduce the concentration of $CO_2$ in the flue gas. A common reactor is a bubbling fluidized bed (BFB) or a circulating fluidized bed (CFB). However, a fluidized bed faces challenges with respect to large-scale applications. That is, in large-scale applications, a massive amount of gas needs to be discharged from colossal coal-fired power plants that operate on megawatt basis. Such amount of gas cannot be adequately handled by the above fluidized bed, leaving the fluidized bed an infeasible means for large-scale applications. Without an effective reactor for large-scale applications, the capture technology for processing $CO_2$ discharged from colossal coal-fired power plants cannot be implemented, in a way that the total emission of $CO_2$ cannot be considerably reduced.

The cement industry also accounts as one of the main sources of $CO_2$ emission. During a combustion process in the cement industry, the concentration of $CO_2$ in a flue gas produced from combustion is only 25 to 30 vol % due to unsatisfactory air combustion and airtightness. As a result, the cement industry also requires the $CO_2$ capture technology for increasing the concentration of $CO_2$ to provide reuse and storage effects. Further, the cement industry is one of the six main power consumption industries, and usually lacks a mechanism for recycling waste heat in the calcination process. Thus, the energy efficiency of the fabrication process of the cement industry is commonly low. Although the energy efficiency of the cement industry may be increased by cogeneration, e.g., producing electricity with waste heat, manufacturers of the cement industry still need to additionally invest enormous amounts of funds and installation costs for such cogeneration.

SUMMARY

The disclosure is directed to a loop tower $CO_2$ capture system and an operating method thereof for reducing $CO_2$ emission.

According to one embodiment, a loop tower $CO_2$ capture system is provided. The loop tower $CO_2$ capture system includes a feeding unit, a carbonator, an accumulator, a calciner, a combustion chamber and a gas blower. The feeding unit has a first gas pipe. The carbonator includes a plurality of first cyclone dust collecting units. One end of the first gas pipe is connected to an uppermost unit of the first cyclone dust collecting units. The accumulator is connected to the carbonator, and is connected to a lowermost unit of the first cyclone dust collecting units. The calciner is connected to the accumulator, and includes a plurality of second cyclone dust collecting units. The accumulator is connected to an uppermost unit of the second cyclone dust collecting units. The other end of the first gas pipe is connected to a lowermost unit of the second cyclone dust collecting units. The combustion chamber is connected to the lowermost unit of the second cyclone dust collecting units. The gas blower is connected to the first gas pipe of the feeding unit.

According to another embodiment, an operating method for a loop tower $CO_2$ capture system is provided. The loop tower $CO_2$ capture system includes a feeding unit, a carbonator including a plurality of first cyclone dust collecting units, an accumulator, a calciner including a plurality of second cyclone dust collecting units, a combustion chamber, a gas blower and a gas recirculating blower. The operating method includes the following steps. An absorbent is driven and forwarded by the gas blower to a top portion of the carbonator via the feeding unit, and a high concentration $CO_2$-containing gas is fed via a bottom portion of the carbonator. As such, the absorbent descends into the first cyclone dust collecting units, and becomes mixed with the $CO_2$-containing gas in a reverse direction to produce powder of a metal carbonate. The powder of the metal carbonate is provided to a top portion of the calciner via the accumulator, and a high temperature $CO_2$-containing gas, after combustion of the combustion chamber, is fed via the second cyclone dust collecting unit in a bottom portion of the calciner. As such, the powder becomes mixed and calcined with the high temperature $CO_2$-containing gas in a reverse direction in the second cyclone dust collecting units to produce a metal oxide and to release $CO_2$. The high temperature $CO_2$-containing gas in the second cyclone dust collecting units is driven by the gas recirculating blower and forwarded to an entrance of the combustion chamber to serve as a feed transporting gas for the powder. The metal oxide is discharged from the bottom portion of the calciner and forwarded into the feeding unit to be utilized as the absorbent.

According to an alternative embodiment, a carbonator is provided. The carbonator includes a feed inlet, a plurality of cyclone dust connecting units connected to one another, and a feed outlet. The feed inlet is located at a top portion of the carbonator, and is connected to an uppermost unit of the cyclone dust collecting units. The feed outlet is located at a bottom portion of the carbonator, and is connected to a lowermost unit of the cyclone dust collecting units and a rotary valve disposed at the feed outlet.

According to an alternative embodiment, a calciner is provided. The calciner includes a feed inlet, a plurality of cyclone dust collecting units connecting to one another, and a feed outlet. The feed inlet is located at a top portion of the calciner, and is connected to an uppermost unit of the cyclone dust collecting units. The feed outlet is located at a bottom portion of the calciner, and is connected to a lowermost unit of the cyclone dust collecting units and a rotary valve disposed at the feed outlet.

Figure 1:
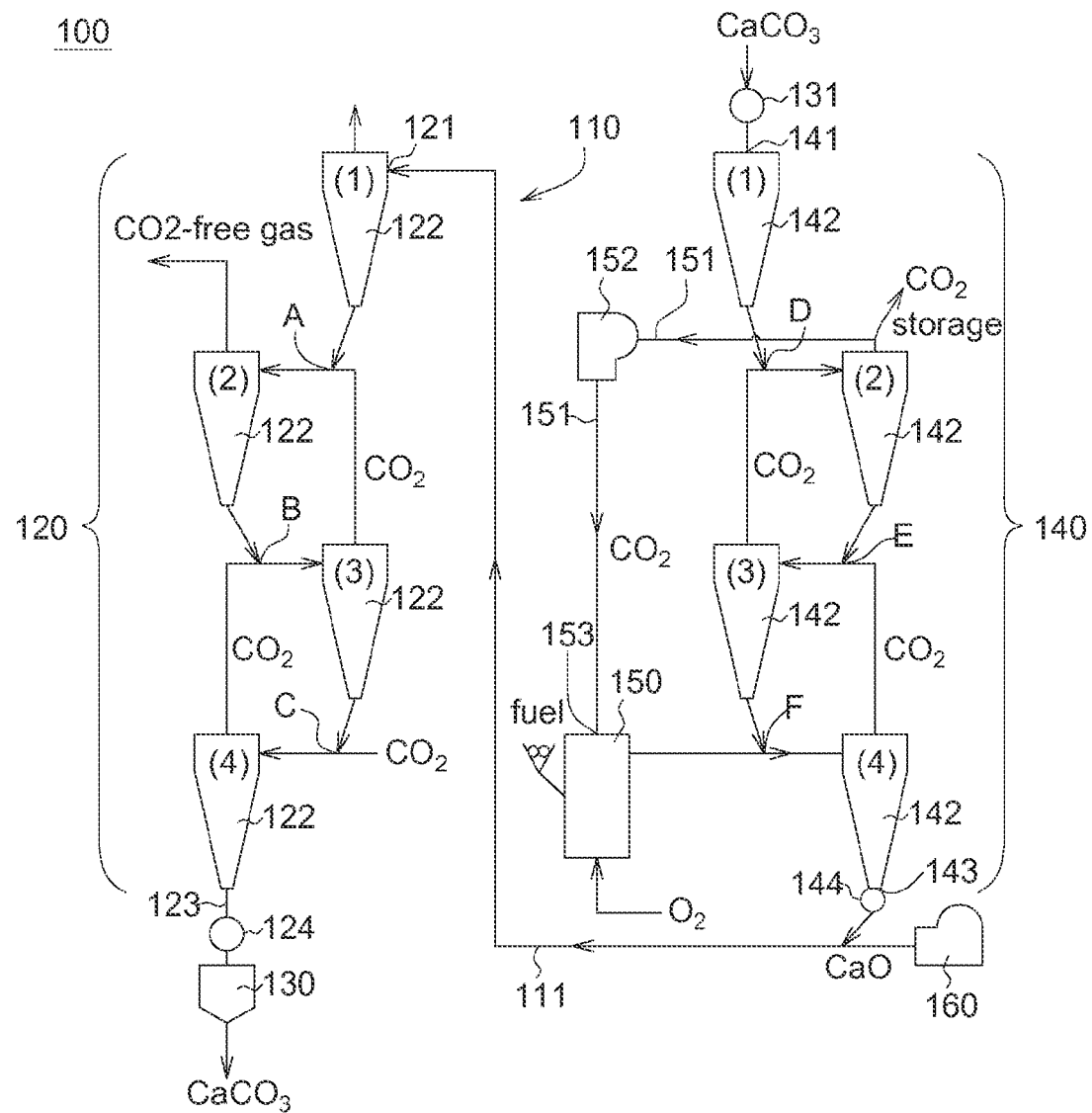
FIG. 1 is a schematic diagram of a loop tower capture system according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

According to one embodiment, a loop tower capture system is provided. Calcium oxide formed in a calciner is delivered into a carbonator and reused as an absorbent for $CO_2$. The loop tower capture system, which is simultaneously operable at a cement plant, can be intervened into a fabrication process without affecting the fabrication process. Such operation means offers a cost-free absorbent for effectively reducing capture costs and enhancing technology competitiveness. Further, as an absorbent is regenerated in collaboration with a low-cost hydration technology, the amount of the absorbent consumed is minimized. Thus, $CO_2$ capture plants need not be located within the vicinity of mining plants and cement plants, and can hence be applied at larger scopes. Further, the number of dust collecting units and the height of the capture tower can be adjusted according to requirements of a $CO_2$ capture rate and an absorbent reaction rate, thereby yielding greater flexibilities in fabrication designs.

In one embodiment, with the principle of high-temperature preheating in a calcination process of a cement plant, the heat exchange is performed between a descending absorbent and an ascending gas in a reverse direction. The absorbent and the gas are mixed and separated in each of cyclone dust collecting units, and carbonation is completed after sufficient reaction temperature and residence time. The process amount of the carbonator in one single tower may reach as high as 150 MW, which is far greater than a physical limit of a fluidized bed commonly applied for capturing $CO_2$. Further, in the present system, the application of calcination is extended to carbonation, i.e., the reverse of calcination. As the calciner and the carbonator are both vertical structures, by vertically stacking the two structures, calcium cycling can be formed through descending powder, thereby overcoming issues of the prior art and enabling the calcium cycling capture technology to be suitable for large-scale applications in the capture field.

Embodiments are described in detail below for one person skilled in the art to better understand the application. It is intended that the specification and examples be considered as exemplary only, not limitations to the application.

First Embodiment

FIG. 1 shows a schematic diagram of a loop tower $CO_2$ capture system 100 according to one embodiment. The loop tower $CO_2$ capture system 100 includes a feeding unit 110, a carbonator 120, an accumulator 130, a calciner 140, a combustion chamber 150, and a gas blower 160. The loop tower $CO_2$ capture system 100 may further include a gas recirculating blower 152.

The feeding unit 110 has a first gas pipe 111. The gas blower 160 is connected to the first gas pipe 111, and drives and forwards an absorbent (e.g., CaO) via the first gas pipe 111 to a top portion of the carbonator 120. In one embodiment, the first gas pipe 111 is connected from the bottom of the tower to the top of the tower, so as to deliver the absorbent from the bottom portion of the calciner 140 to the top portion of the carbonator 120 by means of gas.

The carbonator 120 includes a first feed inlet 121, a plurality of first cyclone dust collecting units 122 that are sequentially connected to one another from top to bottom, and a first feed outlet 123. For example, the number of the cyclone dust collecting units is 3 to 7. The first feed inlet 121 is located at a top portion of the carbonator 120, and the first feed outlet 123 is located at a bottom portion of the carbonator 120.

The first feed inlet 121 is connected between the feeding unit 110 and an uppermost unit (1) of the first cyclone dust collecting units 122. In the carbonator 120, a feed outlet of the uppermost cyclone dust collecting unit (1), a feed inlet of a second uppermost cyclone dust connecting unit (2), and a gas outlet of a middle cyclone dust collecting unit (3) are all connected at a first position A. A feed outlet of the second uppermost cyclone dust collecting unit (2), a feed inlet of the middle cyclone dust collecting unit (3), and a gas outlet of a lowermost cyclone dust collecting unit (4) are all connected at a second position B. Further, a feed outlet of the middle cyclone dust collecting unit (3), a feed inlet of the lowermost cyclone dust collecting unit (4), and a gas inlet for transporting a $CO_2$-containing gas are all connected at a third position C.

Figure 2:
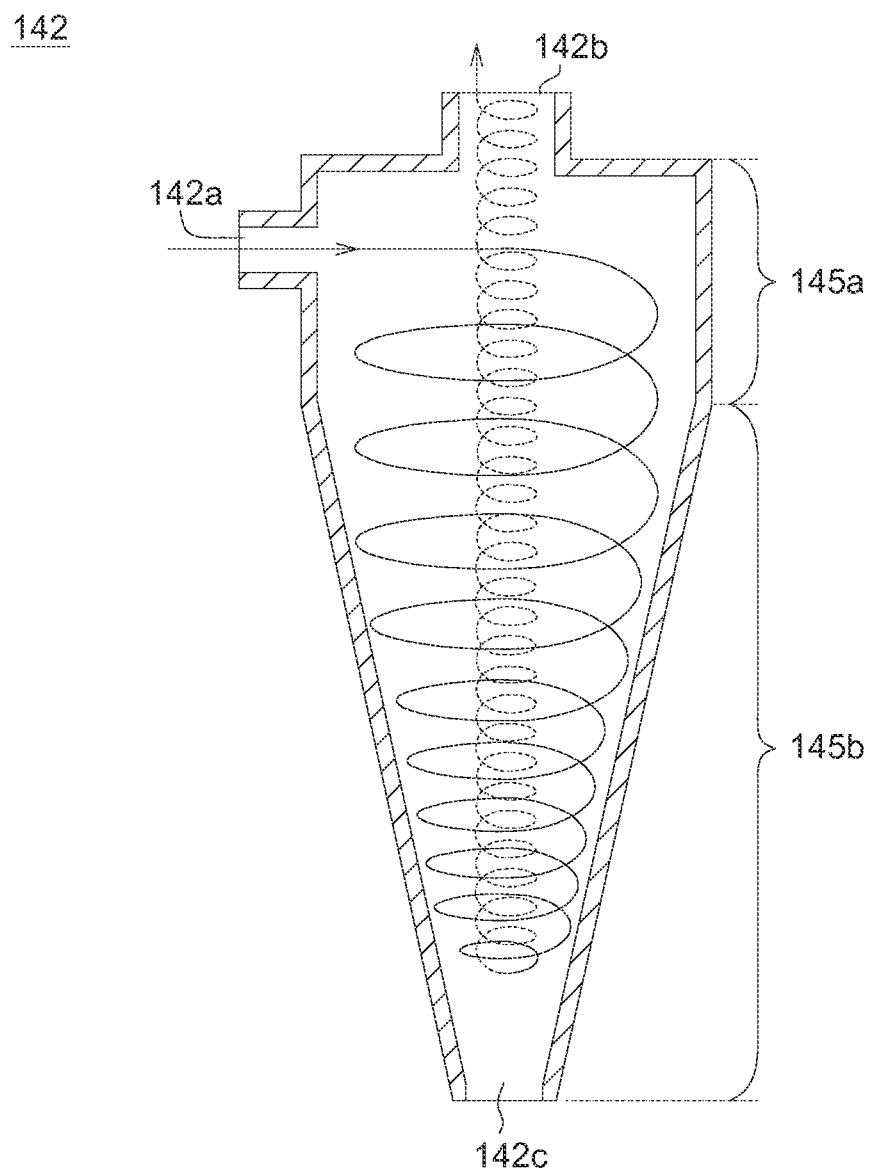
FIG. 2 is a schematic diagram illustrating functions of the cyclone dust collecting unit in FIG. 1.

The structures of the first cyclone dust collecting units 122 are substantially identical. The uppermost cyclone dust collecting unit (1) may serve as a feed area for an absorbent (e.g., CaO), such that a calcined and reacted product (i.e., the absorbent) may descend into the second uppermost cyclone dust collecting unit (2). Taking one single cyclone dust collecting unit 142 for example, the structure and function of the above cyclone dust collecting units are described below. As shown in FIG. 2, the cyclone dust collecting unit 142 is divided into a cylindrical section 145a and a conical section 145b under the cylindrical section 145a. An upper part of the cylindrical section 145a is provided with a gas inlet 142b and a feed inlet 142a, and a lower part of the conical section 145b is provided with a feed outlet 142c. When an absorbent (e.g., a metal oxide) enters the cyclone dust collecting unit 142 along with a $CO_2$-containing gas via the feed inlet 142a, the absorbent enters the cylindrical section 145a with the gas along a tangential direction of the feed inlet 142a and descends in a rotating manner. At this point, the absorbent and $CO_2$ are mixed to perform a carbonation reaction (CaO+ $CO_2 \rightarrow CaCO_3$), and to produce powder of a metal carbonate (e.g., $CaCO_3$). As the powder reaches the conical section 145b, the gas forms a vortex in the cyclone dust collecting unit 142 due to the decreasing rotation diameter. The powder continues to descend under the influence of gravity and becomes discharged via the feed outlet 142c, whereas the gas ascends in reverse rotations at the lower part of the conical section 145b and becomes discharged via the gas outlet 142b. In other words, the cyclone dust collecting unit performs gas-solid separation on the powder and the gas, such that the powder is discharged via the feed outlet 142c at the lower part of the cyclone dust collecting unit and the gas is discharged via the gas outlet 142b at the upper part of the cyclone dust collecting unit.

The first feed inlet 123 of the carbonator 120 is connected between the accumulator 130 and the lowermost unit (4) of the first cyclone dust collecting units 122. A bottom part of the first feed inlet 123 is usually provided with a rotary valve 124 or a flange that is connected to the accumulator 130. The accumulator 130 is connected between the carbonator 120 and the calciner 140, in a way that the powder of a metal carbonate (e.g., $CaCO_3$) enters the calciner 140 after temporarily staying in the accumulator 130.

The calciner 140 includes a second feed inlet 141, a plurality of second cyclone dust collecting units 142 that are sequentially connected to one another from top to bottom, and a second feed outlet 143. For example, the number of the second cyclone dust collecting units 142 is 3 to 7. The second feed inlet 141 is located at a top portion of the calciner 140, and the second feed outlet 143 is located at a bottom portion of the calciner 140.

A top portion of the second feed inlet 141 and a bottom portion of the second feed outlet 143 are usually provided with rotary valves 131 and 144 or flanges, respectively, so as to separate mutual pressure of the carbonator 120 and the calciner 140 from one another.

The second feed inlet 141 is connected between the accumulator 130 and an uppermost unit (1) of the second cyclone dust collecting units 142. In the calciner 140, a feed outlet of the uppermost cyclone dust collecting unit (1), a feed inlet of a second uppermost cyclone dust collecting unit (2), and a gas outlet of a middle cyclone dust collecting unit (3) are all connected at a fourth position D. A feed outlet of the second uppermost cyclone dust collecting unit (2), a feed inlet of the middle cyclone gas collecting unit (3), and a gas outlet of a lowermost cyclone dust collecting unit (4) are all connected at a fifth position E. Further, a feed outlet of the middle cyclone dust collecting unit (3), a feed inlet of the lowermost cyclone dust collecting unit (4), and a gas inlet for transporting a $CO_2$-containing gas are all connected at a sixth position F.

The structures of the second cyclone dust collecting units 142 are substantially identical. The uppermost cyclone dust collecting unit (1) may serve as a feed area for a carbonate product (e.g., $CaCO_3$ powder), such that the carbonate product may descend into the second uppermost cyclone dust collecting unit (2). The structure and function of the second cyclone dust collecting units 142 are in principle the same as those of the first cyclone dust collecting units 122. Associated details can be understood from the above description with reference to FIG. 2, and shall be omitted herein.

The feeding unit 110, the first cyclone dust collecting units 122, the accumulator 130 and the second cyclone dust collecting units 142 are connected to one another to form the loop tower $CO_2$ capture system 100. According to the loop tower $CO_2$ capture system 100, an absorbent (e.g., CaO) enters via the top portion of the carbonator, and becomes mixed with a gas containing a high concentration of $CO_2$ (enters via a bottom portion of the carbonator) and the high temperature $CO_2$-containing gas to perform a carbonation reaction ($CaO+CO_2 \rightarrow CaCO_3$) at an operating temperature of approximately 550° C. to 700° C., and to further produce powder of a metal carbonate (e.g., $CaCO_3$). The powder (e.g., $CaCO_3$) is mixed with a high-temperature gas (approximately 900° C.) for heat exchange to perform a calcination reaction ($CaCO_3 \rightarrow CaO+CO_2$) at a calcination temperature of approximately 900° C. to 1400° C., and to produce a metal oxide (e.g., CaO) and a hot flue gas (containing a high concentration of $CO_2$). The metal oxide, applicable as an absorbent for $CO_2$, is discharged via the second feed outlet 143 and forwarded by the gas blower 160 by means of gas to the top portion of the tower for reuse. In the structure of the loop tower, a period of calcium cycling is completed by the absorbent (e.g., CaO) descending from the top portion of the tower to the bottom portion of the tower.

In one embodiment, the calciner 140 and the carbonator 120 are vertically stacked to form a vertical tower structure. The calciner 140 is located under the carbonator 120, or the calciner 140 is located on the upper part of the carbonator 120. Alternatively, the calciner 140 and the carbonator 120 are arranged in parallel instead of being vertically arranged. The arrangement of the calciner 140 and the carbonator 120 is not limited by the disclosure.

For example, the foregoing high-concentration $CO_2$ (between 10-30%) is from $CO_2$ emitted by a coal-fired power plant or resource industries, and the amount of $CO_2$ emission can be reduced by the abovementioned capture mechanism of the carbonator 120. Further, from the hot flue gas produced by the calciner 140, water can be separated after cooling and condensation to obtain high-concentration $CO_2$ (higher than 90%) that can be directly stored or reused.

In the embodiment, as the calcium oxide produced in the calciner 140 enters the carbonator 120 via the feeding unit 110 and is then recycled, no additional absorbent tower needs to be provided to thereby reduce set-up costs.

In the embodiment, the hot flue gas produced by the calciner 140 has a temperature range of approximately 500° C. to 1000° C. The $CO_2$-containing gas is driven by the gas recirculating blower 152, so that a part of the hot flue gas is delivered via the second gas pipe 151 to an entrance 153 of the combustion chamber 150 to serve as a feed transporting gas for the powder. Further, a part of the hot flue gas is discharged via the gas outlet of the second uppermost cyclone dust collecting unit (2) and is further stored or utilized for $CO_2$ reuse, thereby maintaining the stabilities of pressure and quality of the entire system. After forwarding a part of the gas into the combustion chamber 150, high-purity oxygen (higher than approximately 93%) is appropriately added as a combustion gas in the combustion chamber 150. The high-purity oxygen is combusted with a fuel to 800° C. to 1200° C., and enters the lowermost cyclone dust collecting unit (4). As such, the concentration of $CO_2$ is increased, and overheating caused by pure oxygen combustion is suppressed to further prevent powder sintering and equipment damage.

In the embodiment, the recirculation amount of the gas is a key for controlling the temperature of the gas. The gas flows from top to bottom to perform thorough heat exchange with the powder, and to provide the calcined powder with the required calcination energy. The gas is chiefly composed of $CO_2$ and $H_2O$ vapor, and the calcined powder may be $CaCO_3$, $MgCO_3$, $MnCO_3$ or $NiCO_3$. Therefore, in the embodiment, with the concept of pure oxygen combustion, $CO_2$—$O_2$ combustion can be completed in the combustion chamber 150 of the calciner 140. Further, the temperature of the hot flue gas is controlled by means of flue gas recirculation at 800° C. to 1200° C. to gradually increase the concentration of $CO_2$ in the calciner 140.

In the loop tower capture system and the operating method thereof disclosed by the above embodiments, $CO_2$ is captured by the calcination reaction and the carbonation reaction of calcium cycling to reduce $CO_2$ emission. As such, high-concentration $CO_2$ can be produced for promoting geological storage and industrial recycling. As the recirculated $CO_2$ gas ascends in reverse rotations in the cyclone dust collecting units to perform a thorough calcination reaction with the metal carbonate, and the $CO_2$ gas is further utilized as a feed transporting gas for the metal carbonate through the blower, resource efficiency is enhanced. Further, the metal oxide that the system obtains after calcination may serve as an absorbent or an industrial raw material, and the calcium oxide (CaO) manufactured by the above system favors the mass production of precipitated carbonate calcium (PCC). The PCC can be applied in a wide range in the industrial field and offers high economical values. Moreover, the above system, being a vertical structure, occupies an area much smaller than a fluidized bed and thus solves the incapability of the conventional calcium capture technologies for large-scale applications.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A loop tower $CO_2$ capture system, comprising:
a feeding unit, having a first gas pipe;
a carbonator, comprising a first feed inlet, a first feed outlet, and a plurality of first cyclone dust collecting units connected to one another, one end of the first gas pipe being connected to an uppermost unit of the first cyclone dust collecting units;
an accumulator, connected to a lowermost unit of the first cyclone dust collecting units;
a calciner, comprising a second feed inlet, a second feed outlet, and a plurality of second cyclone dust collecting units, the accumulator being located between the carbonator and the calciner, the accumulator being connected to an uppermost unit of the second cyclone dust collecting units, one other end of the first gas pipe being connected to a lowermost unit of the second cyclone dust collecting units;
a combustion chamber, connected to the lowermost unit of the second cyclone dust collecting units; and
a gas blower, connected to the first gas pipe of the feeding unit.

2. The system according to claim 1, wherein powder of a metal carbonate descends into the second cyclone dust collecting units, and mixes and calcines with a gas in a reverse direction to produce a metal oxide and $CO_2$, and the metal oxide is driven and forwarded to the first gas pipe by the gas blower to enter the feeding unit.

3. The system according to claim 2, wherein the metal oxide descends into the first cyclone dust collecting units via the feeding unit, and mixes with a $CO_2$-containing gas in a reverse direction to produce the powder of the metal carbonate, and the powder of the metal carbonate enters the calciner via the accumulator.

4. The system according to claim 1, further comprising:
a second gas pipe; and
a gas recirculating blower;
wherein, a $CO_2$-containing gas in a second uppermost unit of the second cyclone dust collecting units is forwarded to the gas recirculating gas blower via the second gas pipe, and the gas recirculating blower drives and transports the $CO_2$-containing gas to an entrance of the combustion chamber to utilize the $CO_2$-containing gas as a cooling gas for controlling a calcination temperature of the combustion chamber.

5. The system according to claim 1, wherein a feed outlet of the uppermost unit of the first cyclone dust collecting units, a feed inlet of a second uppermost unit of the first cyclone dust collecting units, and a gas outlet of a middle unit of the first cyclone dust collecting units are connected; a feed outlet of the uppermost unit of the second cyclone dust collecting units, a feed inlet of a second uppermost unit of the second cyclone dust collecting units, and a gas outlet of a middle unit of the second cyclone dust collecting units are connected.

6. The system according to claim 1, wherein a feed outlet of a second uppermost unit of the first cyclone dust collecting units, a feed inlet of a middle unit of the first cyclone dust collecting units, and a gas outlet of the lowermost unit of the first cyclone dust collecting units are connected; a feed outlet of a second uppermost unit of the second cyclone dust collecting units, a feed inlet of a middle unit of the second cyclone dust collecting units, and a gas outlet of the lowermost unit of the second cyclone dust collecting units are connected.

7. The system according to claim 1, wherein a feed outlet of a middle unit of the first cyclone dust collecting units, a feed inlet of the lowermost unit of the first cyclone dust collecting units, and a gas inlet for transporting a $CO_2$-containing gas are connected; a feed outlet of a middle unit of the second cyclone dust collecting units, a feed inlet of the lowermost unit of the second cyclone dust collecting units, and a gas inlet for transporting the $CO_2$-containing gas are connected.

8. The system according to claim 1, wherein the calciner and the carbonator are vertically stacked to form a vertical tower structure.

9. The system according to claim 1, wherein
the first feed inlet is located at a top portion of the carbonator;
the feed inlet is connected to the uppermost unit of the first cyclone dust collecting units; and
the first feed outlet, located at a bottom portion of the carbonator, is connected to the lowermost unit of the first cyclone dust collecting units and a rotary valve disposed at the first feed outlet.

10. The system according to claim 9, wherein a number of the plurality of first cyclone dust collecting units connected to one another is 3 to 7.

11. The system according to claim 1, wherein
the second feed inlet is located at a top portion of the calciner;
the second feed inlet is connected to the uppermost unit of the second cyclone dust collecting units; and
the second feed outlet, located at a bottom portion of the calciner, is connected to the lowermost unit of the second cyclone dust collecting units and a rotary valve disposed at the second feed outlet.

12. The system according to claim 11, wherein a number of the plurality of second cyclone dust collecting units connected to one another is 3 to 7.

13. An operating method for a loop tower $CO_2$ capture system, the loop tower $CO_2$ capture system comprising a feeding unit, a carbonator comprising a plurality of first cyclone dust collecting units connected to one another, an accumulator, a calciner comprising a plurality of second cyclone dust collecting units connected to one another, a combustion chamber, a gas blower and a gas recirculating blower, the method comprising:
driving and forwarding an absorbent by the gas blower to a top portion of the carbonator via the feeding unit, and feeding a $CO_2$-containing gas via a bottom portion of the carbonator, such that the absorbent descends into the first cyclone dust collecting units, and mixes with the $CO_2$-containing gas in a reverse direction to produce powder of a metal carbonate;
forwarding the powder of the metal carbonate into a top portion of the calciner via the accumulator, and feeding in a high temperature gas, after combustion in the combustion chamber, via the second cyclone dust collecting unit in a bottom portion of the calciner, such that the powder mixes and calcines with the high temperature gas in a reverse direction in the second cyclone dust collecting units to produce a metal oxide and to release $CO_2$;

driving and transporting the high temperature gas containing $CO_2$ in the second cyclone dust collecting units by the gas recirculating blower to an entrance of the combustion chamber to utilize the high temperature gas containing $CO_2$ as a feed transporting gas for the powder; and discharging and forwarding the metal oxide via a bottom portion of the calciner into the feeding unit to utilize the metal oxide as the absorbent.

14. The method according to claim 13, wherein pure oxygen and a fuel are added into the combustion chamber to perform pure oxygen combustion.

15. The method according to claim 13, further comprising storing or reusing $CO_2$ in the high temperature gas.

16. The method according to claim 13, wherein the calciner and the carbonator are vertically stacked to form a vertical tower structure, and the absorbent descends from a top portion of the tower to a bottom portion of the tower to complete a cycle.

17. The method according to claim 13, wherein the metal carbonate comprises $CaCO_3$, $MgCO_3$, $MnCO_3$ and $NiCO_3$.

* * * * *